United States Patent
Such Palacios

(10) Patent No.: US 11,478,340 B2
(45) Date of Patent: Oct. 25, 2022

(54) ORTHODONTIC SKELETAL ANCHORAGE DEVICE

(71) Applicants: José Miguel Such Palacios, Valencia (ES); VICTOR CAMPS, S.L., Valencia (ES)

(72) Inventor: José Miguel Such Palacios, Valencia (ES)

(73) Assignees: José Miguel Such Palacios, Valencia (ES); VICTOR CAMPS, S.L., Valencia (ES)

( * ) Notice: Subject to any disclaimer, the term of this patent is extended or adjusted under 35 U.S.C. 154(b) by 124 days.

(21) Appl. No.: 16/838,643

(22) Filed: Apr. 2, 2020

(65) Prior Publication Data

US 2021/0121270 A1    Apr. 29, 2021

(30) Foreign Application Priority Data

Oct. 25, 2019  (ES) .............................. ES201931753U

(51) Int. Cl.
*A61C 8/00* (2006.01)
*A61C 7/00* (2006.01)

(52) U.S. Cl.
CPC .............. *A61C 8/0096* (2013.01); *A61C 7/00* (2013.01)

(58) Field of Classification Search
CPC ..... A61C 8/0096; A61C 7/10; A61B 17/8004; A61B 17/809
See application file for complete search history.

(56) References Cited

U.S. PATENT DOCUMENTS

| | | | | |
|---|---|---|---|---|
| 4,988,351 A * | 1/1991 | Paulos | ............... | A61B 17/8625 606/232 |
| 6,602,257 B1 * | 8/2003 | Thramann | .......... | A61B 17/7059 606/281 |
| 8,728,131 B2 * | 5/2014 | Di Giacomo | ........ | A61B 17/809 606/297 |
| 8,784,420 B2 * | 7/2014 | Steele | ............... | A61B 17/8863 606/79 |
| 9,072,568 B2 * | 7/2015 | Kook | ........................ | A61C 7/18 |
| 10,485,634 B2 * | 11/2019 | Han | ........................ | A61C 7/145 |
| 10,575,926 B2 * | 3/2020 | Kaveh | ....................... | A61C 7/10 |
| 10,743,965 B2 * | 8/2020 | Moon | ........................ | A61C 7/02 |

(Continued)

FOREIGN PATENT DOCUMENTS

| | | |
|---|---|---|
| ES | 2299387 A1 | 5/2008 |
| KR | 20100087979 A | 8/2010 |

(Continued)

OTHER PUBLICATIONS

International Search Report dated Jan. 11, 2021 for International Application No. PCT/ES2020/070623.

*Primary Examiner* — Ralph A Lewis
(74) *Attorney, Agent, or Firm* — Seager, Tufte & Wickhem LLP

(57) ABSTRACT

The invention proposes an orthodontic anchorage device, which may be used in combination with others, comprising a plate with two, three or four pointed end stems distributed on one of its surfaces and at least two holes at the ends adapted for the insertion of micro screws. These stems are intended to slightly rest on the bone through the palatine mucosa, preventing the entire appliance from digging into the palate.

2 Claims, 3 Drawing Sheets

(56) References Cited

U.S. PATENT DOCUMENTS

| | | | |
|---|---|---|---|
| 2001/0036614 A1* | 11/2001 | Farzin-Nia | A61C 7/10 433/7 |
| 2002/0150856 A1* | 10/2002 | Payton | A61C 7/00 433/8 |
| 2005/0142513 A1 | 6/2005 | Hotta | |
| 2011/0143300 A1* | 6/2011 | Villaalba | A61C 7/10 433/7 |

FOREIGN PATENT DOCUMENTS

| | | |
|---|---|---|
| WO | 2011118941 A2 | 9/2011 |
| WO | 2012023736 A2 | 2/2012 |
| WO | 2017104913 A1 | 6/2017 |

* cited by examiner

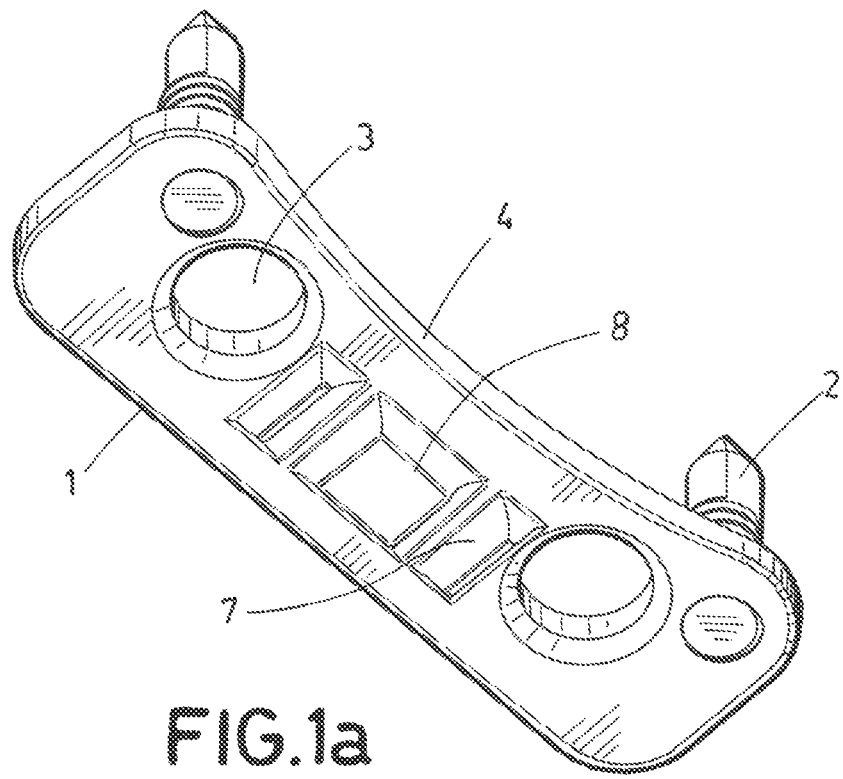
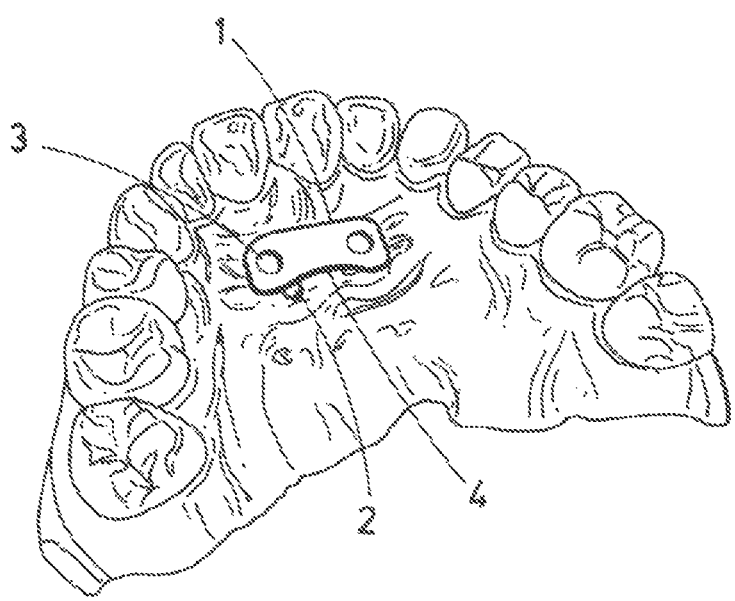

ORTHODONTIC SKELETAL ANCHORAGE DEVICE

CROSS-REFERENCE TO RELATED APPLICATIONS

This application claims priority to Spanish Utility Model No. U 201931753, filed Oct. 25, 2019, the contents of which is incorporated herein by reference.

FIELD OF THE ART

The invention belongs to the field of orthodontics, in particular, to bone anchorage devices for the manufacture of various appliances. The anchorage device of the invention can also be used alone or as part of a complex system in which each element is a device according to the invention in its various implementations.

BACKGROUND OF THE INVENTION

In orthodontic treatments, the use of skeletal anchors (fixed and immovable point in the bone from which all types of orthodontic movement of the teeth or neighboring bone structures can be made) has become popular. Through this type of support or anchorage, dental movements that were unthinkable a few years ago can be carried out. The skeletal anchorage devices that are usually used with micro screws are miniplates or plates. They can have two types of support: dental support (1) or micro screws with a support plate or base (2).

1. It is known that skeletal anchorage orthodontic appliances used in conjunction with micro screws need to be supported on the adjacent teeth to avoid their displacement towards the palate and the consequent injury to it by the force exerted when the screws are threaded in the direction of the palate. This appliance is kept fixed and in a stable position at the site of the operation, thanks to two opposing forces: the micro screws that exert pressure towards the palate and the dental support that neutralizes this force and keeps the device in a position that is a few millimeters away from the palate and stabilized.

2. An alternative to the use of dental supports is the previous placement of micro screws in the palate with a support base on which the plate is supported. Once this first operation has been carried out, an impression or measurement is taken with dental silicone using the appropriate technique in order to reposition them on a plaster model of the mouth. On this replica of the mouth the preparation of the appliance is carried out in the laboratory. Once the anchorage device has been made, it is taken to the mouth and then fixed by means of some cover screws or caps that are screwed onto the micro screws initially placed. With this technique, the device is held between the support base of the primary micro screw and the second cover screw placed over the first one, but this appliance is cumbersome and requires several previous steps to place the device in the mouth, each step being a source of error. Therefore, the appliance based on this technique involves numerous repetitions, due to imprecise adjustments, despite the fact that this technique is carried out meticulously.

Once the auxiliary skeletal anchorage appliance is in place, tooth movements can be made supported by the appliance in the three planes of space: in the transverse or lateral plane (expansion and compression), in the vertical plane up and down (intrusion and extrusion) and in the sagittal plane forward or backward (protrusion and retrusion of the jawbone), as well as the correction of dental arch asymmetries and the basic movements of the teeth described as 1st, 2nd and 3rd order (Canut Brusola José A. Clinical Orthodontics, Second Edition Barcelona: Masson Publishing House. 1999 William R. Proffit (1994); Ortodoncia. Teoria y Práctica. Bases biológicas del tratamiento ortodóntico. Second Edition. Mosby, Madrid).

SUMMARY OF THE INVENTION

The object of the present invention is to provide a simpler orthodontic skeletal anchorage device that avoids the need of dental supports to prevent the above-mentioned appliance from digging into the palatine mucosa.

Similarly, the proposed system avoids the prior placement of micro screws, the use of replicas for making appliances and the use of cover screws described above.

To this end, the invention proposes an orthodontic anchorage device (which may be used in combination with others) comprising a plate with two, three or four pointed end support stems distributed on one of its surfaces and at least two holes at the ends adapted for the insertion of micro screws. These support stems (these and only these) rest slightly on the bone, crossing the palatine mucosa and preventing the entire appliance from digging into the palate.

In this way, the prepared appliance is kept correctly positioned and stabilized by two antagonistic forces, the pressure of the micro screws that fix it and the support of the pointed stems resting on the jawbone.

BRIEF DESCRIPTION OF THE FIGURES

In order to assist in a better understanding of the features of the invention and to complement this description, the following figures, which are illustrative and not restrictive in nature, are attached as an integral part thereof:

FIGS. 1a and 1b show a lateral device and its placement according to the invention;

DETAILED DESCRIPTION

Figure 2:
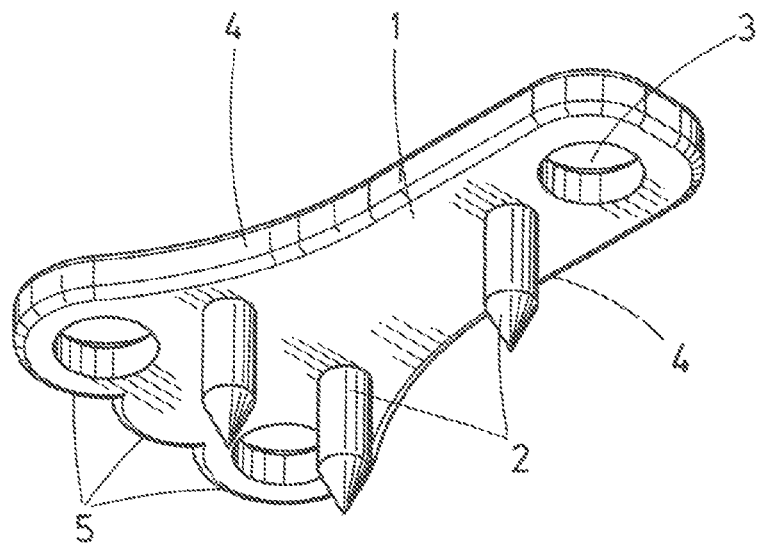
FIG. 2 is a medial device according to the invention.

With reference to FIG. 1a, the present invention solves the technical problem of anchorage support by means of an anchorage device provided with at least an elongated shaped plate 1 with rounded corners. On one of its faces, preferably in the central area, the plate is provided with two (2), three (3) or four (4) bone support stems ending in a point 2. In addition, the device is fitted with at least two holes 3 adapted for the insertion of micro screws, at the ends of the plate, along its longitudinal axis.

The invention provides a simple solution, which is not included in any of the devices used in orthodontic treatments, consisting of the fact that the bone support stems compensate and prevent that, due to the pressure made when inserting the micro screws for the placement of the appliance, the latter is driven into the palatine mucosa, making the palatine's functionality unfeasible.

The stems 2, pins or cylindrical abutments with conical tips serve as stabilizers for the appliance and at they provide secondary anchorage or bone support for the primary anchorage micro screws of the appliance.

The stems 2 can be fixed and constitute a single unit with the central bodies or can be removed by means of a thread to be able to change them in order to have the necessary length to adapt the appliance to each case, according to the maxillary morphology. In another embodiment, the stems 2 can be complemented with extensions that allow for varying the length of the stems to keep the appliance at the right distance from the palate.

FIG. 1a shows an implementation of the invention in the form of a side plate, which has a plate 1 having a rectangular shape with rounded corners and edges. FIG. 1a shows one of the long sides 4 slightly curved (i.e. one side has a concavity, with the center of curvature outside the plate), but the plate can be rectangular, with rounded corners and parallel sides. The ends have two holes 3 for inserting micro screws, with their centers on the longitudinal axis of the device. The device can be used indistinctly on the right or left side of the palate, as appropriate, or even longitudinally to replace the central plate described below, in the case of very narrow palates. The device is fixed to the maxillary bone by means of two micro screws that penetrate the bone through the two holes located in the longitudinal axis. The stems 2 are distributed on the plate, preferably in the central area, ending in a point, forming the skeletal support, an essential part of the invention.

Figure 4:
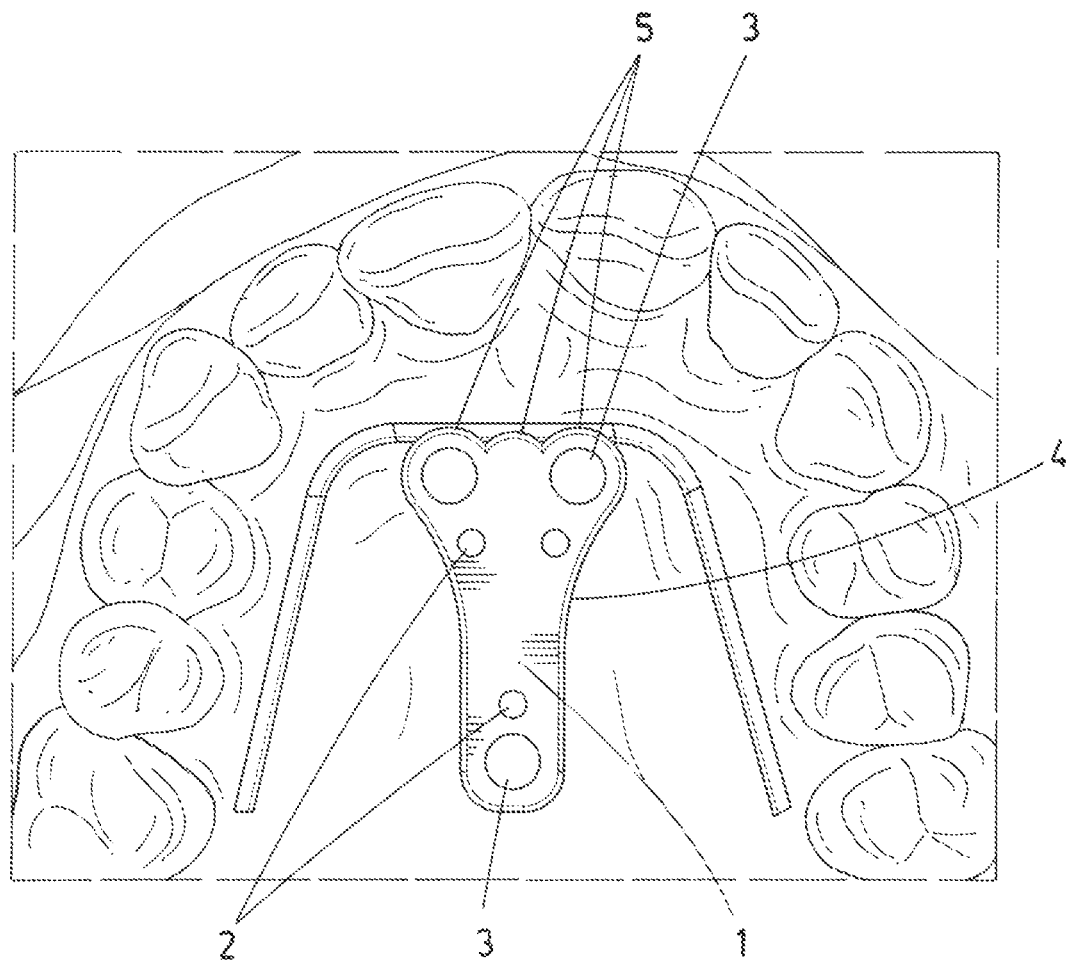
FIG. 4 shows one of the devices already placed on the palatine mucosa and fitted with wires to promote orthodontic movements.

The lateral plate is designed to be used in pairs and as a base on which a rapid expansion screw, already known in the previous state of the art, is welded to make a purely skeletal anchorage or a hybrid anchorage palatal expander if the arms of the expansion screws are fixed to the molar bands, constituting a hybrid expander (dental and skeletal support). It can also be placed transversely as a single piece and the appropriate wires or springs can be welded to it to promote any orthodontic movement (FIG. 4). On the opposite side of the stems, there are optionally two half-round slits 7 and a trapezoidal projection 8 between the two notches. Wires can be placed over the slits 7 and in contact with this projection (FIG. 4) to facilitate dental movements.

With reference to FIG. 2, a medial plate (placed in the center of the palate) in accordance with the invention has a Y-shaped structure, with both long edges 4 curved towards the transversal axis of the plate 1. The mesial end (anterior), ends in three semicircular lobes 5 over which a wire is welded, which, when properly shaped, allows the performance of numerous dental movements. The lobes on the sides are provided with holes 3 for the placement of the micro screws that hold the plate to the maxillary bone. The distal end is provided with a third hole 3 to accommodate a third micro screw. Three support stems 2 are placed as in the previous implementation in the center of the plate 1 and by resting them slightly on the bone they provide the stability of the device and a proper skeletal anchorage. A steel wire can be welded onto the lobes which, once shaped and properly connected to the upper molars, allows various movements to be made on them by means of auxiliary attachments such as springs, pins and set screws of different structures.

This plate is used indifferently with the one previously mentioned as a side plate being absolutely interchangeable having as a significant difference the insertion with three micro screws instead of two, maintaining the same functions as the side plate.

Figure 3:
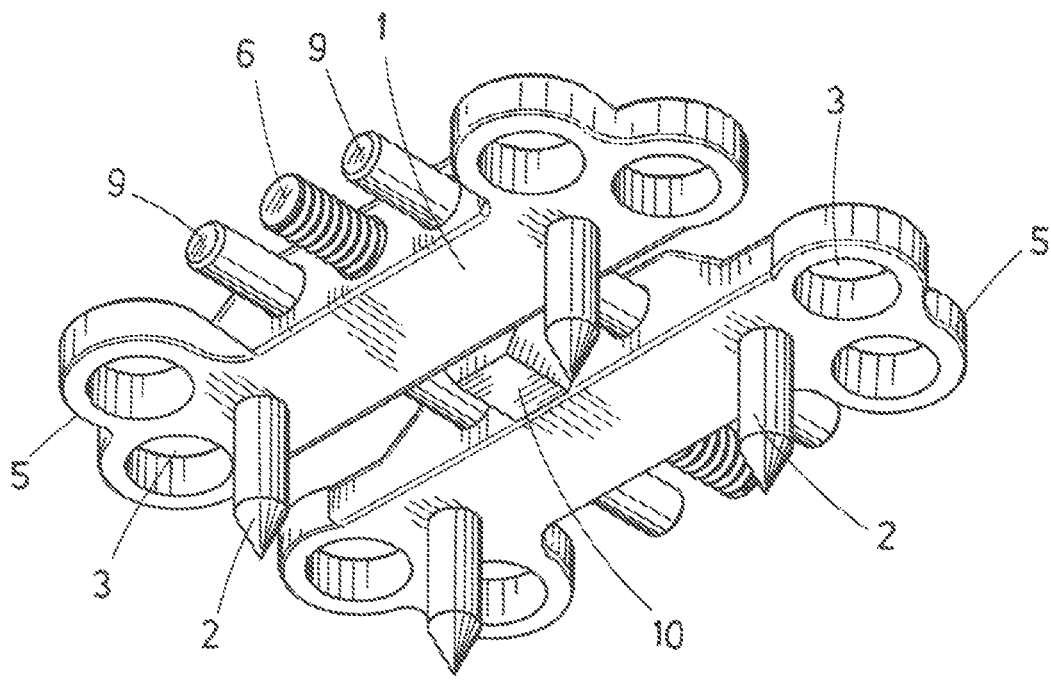
FIG. 3 shows an expansion screw, consisting of two modified side devices joined by a threaded rod.

FIG. 3 shows a skeletal expansion screw according to the invention. This screw comprises two symmetrical plates 1 which, like the whole system, has bone support stems in common and can be attached to the plates or threaded into them and therefore they are removable. The lateral bodies may be provided with slits 7 and trapezoidal projections 8 as in the first implementation, intended for welding a round wire, the purpose of which is to attach it at its terminal end to the bands of the maxillary molars or to any spring intended to provide anchorage for orthodontic movements.

The central bodies have two stems 3 each on their central axis at the junction between the front and middle third portion, and the middle and back third portion. The stems 2 are intended to provide support on the maxillary bone, separating the bone from the expansion screw, and in turn serving as a secondary bone anchorage. Finally, the lateral bodies have three lateral holes. The end holes are designed to accommodate two connecting rods 9 at the anterior and posterior ends. These serve to connect the bodies and allow them to move horizontally along the entire length of the rods.

The central hole, slightly larger in diameter than the previous ones, has an internal thread and houses a threaded rod in the center of which a hexagonal nut 10 with holes on each side is placed to facilitate the activation of the rod, according to which the bodies are separated. This rod threaded into the plates is characterized by a reverse thread, this means that the right side of the threaded rod from the hexagonal nut placed in the center of the same has a right-hand rotation thread and the other part of the rod has a left-hand thread so that when it is rotated (activated), if the direction of rotation is clockwise, the plates are separated and, if it is counterclockwise, they are approached.

Finally, it should be added that the whole system is used by assembling or combining some pieces with others by means of welding them, thus allowing the creation of a highly versatile appliance with only three elements (a central plate, a lateral plate and an expansion screw) to carry out most orthodontic movements.

In view of this description and figures, the person skilled in the art may understand that the invention has been described according to some preferential embodiments thereof, but that multiple variations may be introduced in said preferential embodiments, without exceeding the object of the invention as claimed.

What is claimed is:

1. An orthodontic anchorage device comprising:
   at least one elongated plate with rounded corners, wherein the elongated plate comprises:
   at least two holes at ends of the elongated plate, the at least two holes adapted for the insertion of bone anchorage micro screws; and
   between two to four point-ended bone support stems distributed on one side of the elongated plate, wherein the support stems are threadedly attachable to the elongated plate and thereby removable from the elongated plate; and
   wherein:
   the elongated plate is Y-shaped;
   the elongated plate includes three lobes at a first end of the elongated plate;
   a first lobe and a second lobe of the three lobes, wherein each of the first lobe and the second lobe define a hole adapted to introduce bone anchorage micro screws; and
   the elongated plate defines a third hole at a second end of the elongated plate adapted to receive a bone anchorage micro screw.

2. An orthodontic anchorage device comprising:
   at least one elongated plate with rounded corners, wherein the elongated plate comprises:

at least two holes at ends of the elongated plate, the at least two holes adapted for the insertion of bone anchorage micro screws; and between two to four point-ended bone support stems distributed on one side of the elongated plate, wherein the support stems are threadedly attachable to the elongated plate and thereby removable from the elongated plate; and wherein the elongated plate has a trapezoidal projection in a middle portion of the elongated plate, a first half-round slit on a first side of the trapezoidal projection, and a second half-round slit on a second side of the trapezoidal projection.

* * * * *